W. G. FORDING.
TIRE.
APPLICATION FILED JUNE 19, 1916.
1,401,148.
Patented Dec. 27, 1921.
2 SHEETS—SHEET 2.
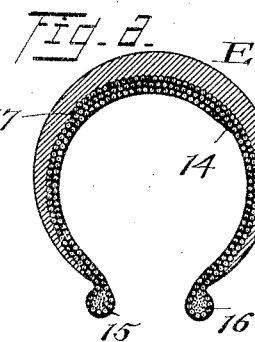
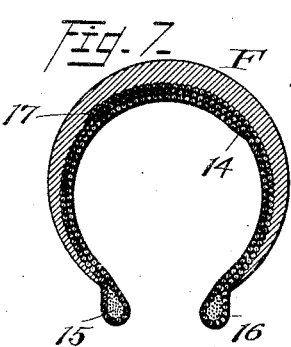
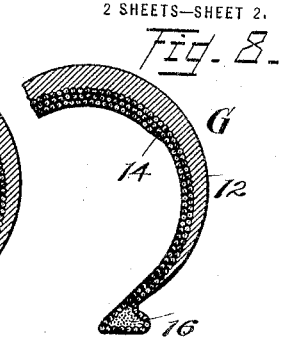
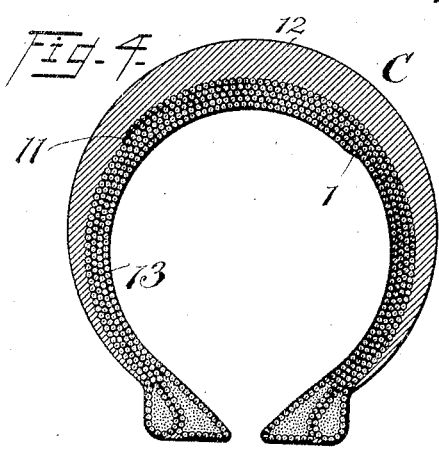
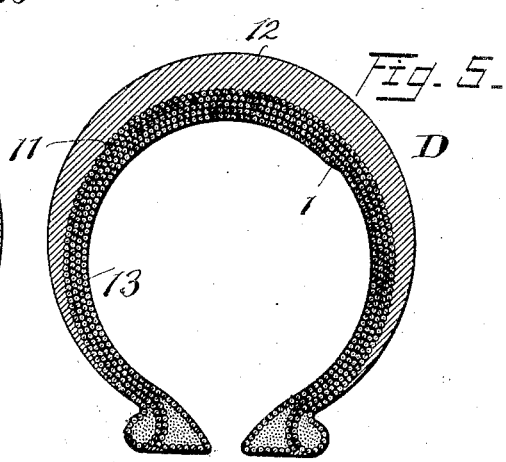
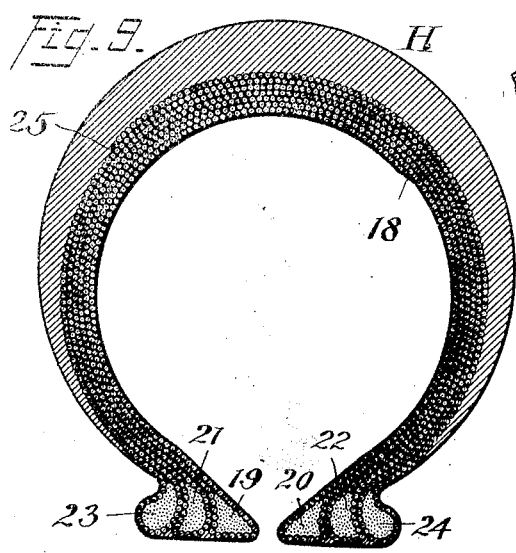
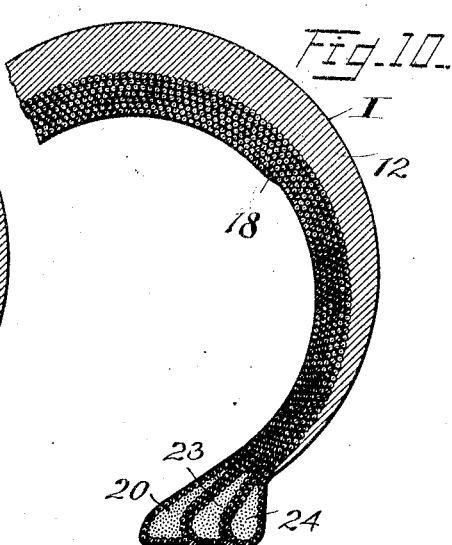
Inventor
William G. Fording
by Thurston & Kwis
Attys.

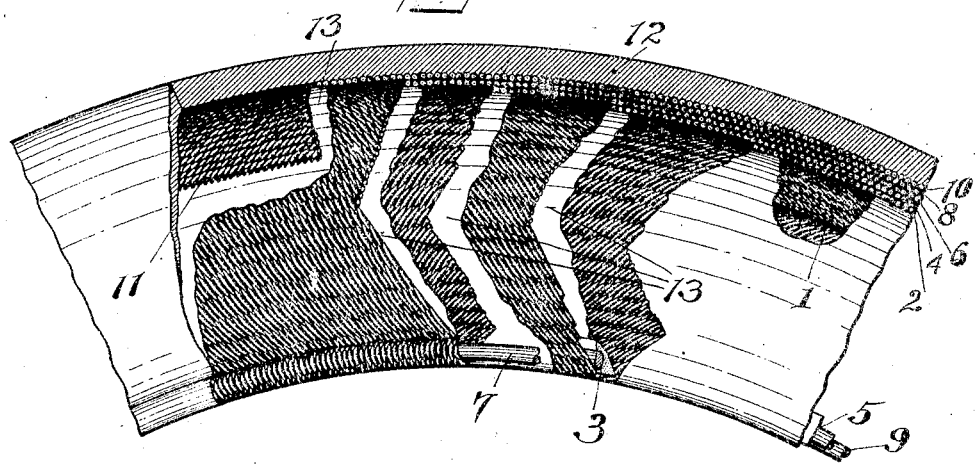
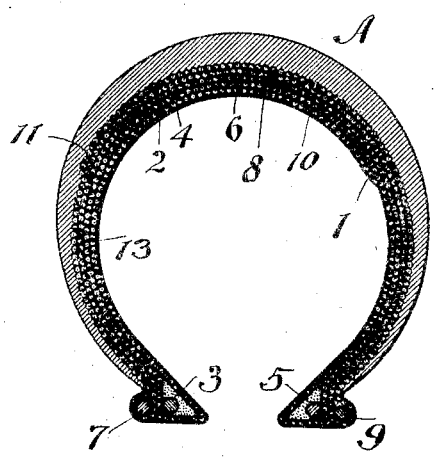
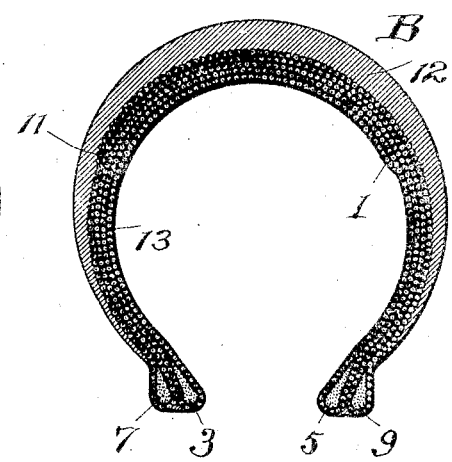

UNITED STATES PATENT OFFICE.

WILLIAM G. FORDING, OF CLEVELAND, OHIO.

TIRE.

1,401,148.  Specification of Letters Patent.  Patented Dec. 27, 1921.

Application filed June 19, 1916. Serial No. 104,390.

*To all whom it may concern:*

Be it known that I, WILLIAM G. FORDING, a citizen of the United States, residing at Cleveland, in the county of Cuyahoga and State of Ohio, have invented a certain new and useful Improvement in Tires, of which the following is a full, clear, and exact description.

This invention relates to tires for automobiles and the like, and has for its main object to provide a tire of improved construction which can be manufactured inexpensively and has great strength and durability.

A further object is to provide an improved cord tire, that is to say, a tire the fabric or so-called fabric portion of which is formed from cords preferably composed of twisted strands suitably rubberized.

Still further the invention aims to provide a cord tire so constructed that the individual cords of all layers are of exactly the same tension; wherein the cord fabric is free from circumferential laps or joints, loose ends of cords; and contains no pockets or deposits of air.

A still further object is to provide a novel cord tire construction which may be embodied in tires of any size, that is, into the smaller size tires as well as the larger size; which can be provided with any desired number of layers of the cord, and which can be provided during the process of placing the cord fabric on the tire-forming core with beads of any desired shape or size and of any desired material.

The above mentioned and additional advantages and objects are attained by my invention, which may be briefly summarized as consisting in certain novel details of construction and arrangements of parts which go to make up the tire, as will be described in the specification and set forth in the appended claims.

A tire constructed in accordance with my invention has a plurality of layers of cord or equivalent tire-forming material preferably in the form of a continuous annular sheath which is laid back and forth across the tire from one side to the other and looped around bead sections which are formed in separate or individual parts or units. The cords or portions of the tire-forming material forming each layer are arranged at an angle to the portions forming the adjacent layer or layers, and the different layers are preferably separated by layers of rubber which as well as the bead units are placed in position as the tire carcass is built up layer by layer.

My invention is illustrated in several forms in the accompanying drawings, in which Figure 1 is a side view of a portion of a tire embodying the invention, different parts being broken away to show the several layers of the cord fabric and rubber between the cord layers, the tire here shown having four layers of cord fabric with an extra layer of fabric at the tread; Fig. 2 is a transverse sectional view through the same; Fig. 3 is a similar view with a modification in the shape and material forming the bead; and Figs. 4 to 10 are transverse sectional views through tires made in accordance with my invention, these views illustrating tires of different sizes, or of different number of cord layers, as well as different shapes and sizes of beads.

The tires illustrated in the drawings, and constructed in accordance with my invention in all its forms includes a cord or cord fabric portion formed preferably from cords which are preferably rubberized, and may be formed from twisted strands of fiber. The cords are in the form of superposed layers of which there may be any number and which are formed from continuous cords or equivalent tire-forming material which are passed back and forth across or around the tire to form one layer after the other. In fact, my invention has for one of its important advantages the fact that it may be embodied in any size of tire and with any number of the superposed layers, without requiring any material change in the apparatus or method by which the tire is constructed.

It will be observed from Fig. 1, wherein portions of the tire are broken away so as to illustrate in side elevation the several layers of cord, that the cords of each layer are parallel; that they are arranged closely, side by side; that each extends around or across the tire from one side to the other diagonally; and that the cords of each layer are at an angle to the cords of the adjacent layer or layers. It will be observed also from this same figure, that between the adjacent layers of cord is a layer of rubber which is preferably provided to avoid or eliminate deleterious action due to rubbing or friction between adjacent layers. I wish it to be understood, however, that the intervening layers of rubber are not essential to my invention, and may if desired be omitted.

A further improved feature of my invention lies in the fact that the cords of all the layers, regardless of how many there may be, are formed from the same cords, or from continuous cords which extend back and forth from one side of the tire to the other in unbroken succession. This is rendered possible by a novel construction and manner of forming the beads which are in the form of separate sections or units which serve as retainers about which the cords are looped or passed in forming the superposed layers of cords from the same continuous cords. As will appear subsequently, the number of bead sections or units, or cord retainers which are embodied in the rim portions of the tire, at the time that the superposed layers are formed or applied, depends upon the number of layers, there being a bead unit provided in each rim or rim portion of the tire for each two layers of cord. An additional advantage of the cord layers arranged and formed as stated resides in the fact that there are no transverse laps or joints, and this feature or advantage results from the fact that not only are the layers formed by passing the cords back and forth around the tire from one side thereof to the other, but also from the fact that the layers, in the preferred construction, are formed from a continuous sheath of cords which extends entirely around the tire, or completely encompasses the core upon which the tire is formed, this sheath being formed from a sufficient number of cords that when laid side by side they form a covering or layer extending in unbroken succession completely around the tire, the cords being in close contact at the rim portions of the tire.

In Figs. 1 and 2 I have illustrated a tire A, having four layers of cord (in addition to an extra thickness to be referred to presently.) It will be observed that the inner layer begins at 1, passes over the periphery of the tire, down the side, forming the innermost layer 2; around the bead or bead section 3, up the side, over the periphery and down the opposite side, forming the next layer 4; around the bead or bead section 5, up the adjacent side, over the periphery and down the opposite side, forming the next layer 6; around the bead or bead section 7, which combined with the bead or bead section 3 forms a complete unitary bead for one side of the tire; then up the side, over the periphery and down the opposite side, forming the next layer 8; around the bead or bead section 9, which with the bead or bead section 5 forms the unitary bead for the other side of the tire; and then up the side, over the periphery, forming the outermost layer 10 to the point or line 11 where the cord fabric terminates. While I do not wish to be confined to the starting of the innermost layer at or adjacent the point 1, and the ending of the outermost layer at or adjacent 11, nevertheless I prefer that the first and last layers be started and ended at or about the points or along the lines shown and described, for this gives an added thickness of cord at the tread portion, which is very advantageous. At 12 is shown the rubber tread of the tire, which tread is common with all pneumatic tires, and at 13 is shown layers of rubber which act as an inner covering for the tire, and also as separators between the layers of the cord fabric so as to eliminate friction.

Although the method of forming the tire just described is not claimed herein, but in a separate application, it may be stated that as each layer of cord is formed on the core of the tire-forming machine, the bead section is applied about which the sheath of cords is looped to form the beginning of the next layer, so that the bead sections are applied as the forming of the tire carcass proceeds. The same is true also of the intermediate layers 13 of rubber.

The beads or bead sections may be formed of any suitable material. For example, they may be formed of circumferentially wound cords or threads, a sufficient number of turns of which will be provided to form a bead section or unit of the desired size and shape, or they may be formed of rubber, or of wire, or of both wire and circumferentially wound threads as illustrated in Figs. 1 and 2, or of any other suitable material.

The tire illustrated in Figs. 1 and 2 has a bead, shaped to correspond to that of an ordinary clencher tire. In Fig. 3 I have shown a tire B, which is similar in all respects to that shown in Fig. 2, except as to the bead which is here shown as a straight side bead, and in this instance the wires are omitted from the bead sections or units.

In Figs. 4 and 5 I have shown tires C and D, having the same number of layers of fabric as the tires A and B, the tires C and D differing from A and B simply in the form and size of the beads.

In Figs. 6, 7 and 8 I have shown at E, F and G, tires having two layers of the cord fabric, that is to say, two layers, disregarding the added thickness at the tread. These three tires differ from each other simply in the shape and size of the beads, two forms of clencher beads being shown in the tires E and G, and a straight side bead being shown in tire F. In each of these three instances the fabric starts at 14, passes around the periphery, down the side, around the bead 15, then back around and across the tire to the opposite side, and around the bead 16, and then back again over the tire to the point or line 17, where the fabric ends.

In Figs. 9 and 10 I have shown at H and I, two six-layer tires, the tire H, having a clencher bead, and the tire I, having a straight sided bead, the two tires aside from the shape of the beads being similar. It will be observed that in each instance the fabric starts at 18, passes around the periphery, down the side, and around the bead or bead section 19, then back around the tire, down the opposite side and about the bead or bead section 20, then back around the tire and about the bead section 21, then back around the tire and about the bead section 22, then back around the tire and about the bead section 23, which with the bead sections 21 and 19 form the complete bead at one side of the tire; then back around the tire and about the bead section 24, which with the bead sections 22 and 20 form the complete bead at the opposite side of the tire, and then back around the tire to the point of line 25, where the fabric ends.

It will be seen therefore, that a tire constructed in accordance with my invention can be formed in any size or with any number of layers; that it can be provided with any desired shape and size of bead so as to adapt the tire for any of the well-known types of rims. It will be understood also, that by forming all the layers of the same cords, all the cords of the several layers can be given the same tension at all points, and with the layers formed by passing the sheath of cords back and forth across the tire and about the bead sections or units, the air is very effectively excluded from the structure of the tire, and there are no transverse joints or laps of fabric, an exceedingly strong and durable tire is produced and what is equally important from a manufacturing standpoint, it can be produced rapidly, and therefore inexpensively.

While I have explained the preferred forms of my invention, and some of the preferred materials, I do not wish to be confined to the same, but aim in my claims to cover all modifications which do not involve a departure from the spirit and scope of my invention in its broadest aspects.

Having thus described my invention, what I claim is:

1. An open tire or tire shoe having a fabric portion composed of tire-forming material extending in unbroken succession back and forth from the rim portion on one side to the rim portion on the other side so as to form a plurality of layers, said material being in the form of a sheath extending circumferentially entirely around the tire and having its inner and outer ends terminating in the inner and outer layers and separated by at least one complete layer.

2. An open cord tire or tire shoe having a fabric composed of a plurality of layers, said layers consisting of a sheath of cords extending circumferentially entirely around the tire and laid back and forth across the tire, so as to form successive layers the portions forming each layer being at an angle to the portions forming the adjacent layers said sheath having its inner end in the innermost layer separated from the outer end by at least one complete layer.

3. An open tire or tire shoe formed from rubber and cords with bead units at the inner periphery of the tire, the cords extending back and forth around the tire from one side to the other so as to form a plurality of layers and looped around the bead units, said layers being formed from a continuous sheath or circular envelop of transversely extending cords one end of the sheath terminating in the inner layer and the other end of the sheath terminating in the outer layer.

4. An open tire or tire shoe having a fabric body and bead units at the inner portion thereof, said fabric body comprising layers of continuous tire-forming fabric in the form of a sheath extending circumferentially entirely around the tire and passed back and forth around the tire from one side thereof to the other and at each side of the tire looped around the beads, the ends of the sheath being located in different layers and anchored independently of each other.

5. An open tire or tire shoe having a fabric body and bead units at the rim portion thereof, said fabric body having successive layers formed from the same or continuous tire-forming material in the form of a sheath of cords which extend in a diagonal direction around the tire from one bead to the other, and said sheath as a whole extending circumferentially entirely around the tire and passed back and forth from one side to the other around the bead units so as to form the said successive layers, the ends of the sheath being located in different layers and being separated by at least one complete layer.

6. An open tire or tire shoe having a fabric body and beads at the rim portion thereof, said body being formed from a sheath of tire-forming material which extends circumferentially entirely around the tire, and which is passed back and forth from one side of the tire to the other to form successively the different superposed layers, the inner end of the sheath beginning at a point or on a line between the two beads and extending under and around a bead at one side of the tire, then over the first layer thus formed, around the tire to the opposite side where it passes under and around over a bead at the opposite side and then at least part way around the tire over the second layer.

7. An open tire shoe having a number of bead sections at each side and a fabric consisting of continuous cord extending in unbroken succession back and forth across the tire and looped around the different bead sections so as to form a plurality of layers continuous with one another, the inner and outer edges of the fabric lapping so as to provide an additional thickness of cord at the tread.

In testimony whereof, I hereunto affix my signature.

WILLIAM G. FORDING.